United States Patent Office 3,563,934
Patented Feb. 16, 1971

3,563,934
STABILIZED, PLASTICIZED POLYPHENYLENE OXIDE COMPOSITIONS
Robert E. Burnett, Schenectady, N.Y., assignor to General Electric Company, a corporation of New York
Filed Apr. 22, 1969, Ser. No. 818,425
Int. Cl. C08g 51/26, 51/60
U.S. Cl. 260—30.4
10 Claims

ABSTRACT OF THE DISCLOSURE

Incorporation of an alkanolamine or a morpholine in a polyphenylene oxide improves the flow and stability of the polymer during molding. These properties permit lighter colored objects to be more easily molded from the polymers.

---

This invention relates to polyphenylene oxides having incorporated therein a small but effective amount of an alkanolamine or a morpholine to improve the stability and flow properties of the composition during molding.

The polyphenylene oxides, also known as polyphenylene ethers, and methods of making the same are disclosed and claimed in U.S. Pats. 3,234,183, 3,306,874, 3,306,875 and 3,432,466, all in the name of Allan S. Hay, and 3,228,910, 3,257,357 and 3,257,358, all in the name of Gelu S. Stamatoff, the contents of which are incorporated herein by reference. They are characterized by the unique combination of mechanical, chemical and electrical properties over a broad range of temperature which render them suitable for a wide variety of commercial applications. Although, they are thermoplastic polymers, their softening point is generally so high that temperatures higher than normally used in molding thermoplastics are required to mold these polyphenylene oxides, i.e., by compression, injection, transfer, blow molding, etc. Because of the high temperatures required for molding, these polymers are subject to more severe oxidation by contact with air at these elevated temperatures causing some discoloration of the polymer.

One approach to solving this problem of discoloration at elevated temperatures is disclosed and claimed in U.S. Pat. 3,383,435—Cizek by incorporating a polystyrene into the polyphenylene oxide to lower its melt viscosity thereby permitting molding of the composition at a lower temperature. This is a very useful technique for modifying polyphenylene oxides providing the resulting molded article does not have to be subjected to elevated temperatures, since the incorporation of the polystyrene does lower the maximum temperature to which this polyphenylene oxide as a molded article can be subjected. Unexpectedly, I have now found that incorporation of an alkanolamine or a morpholine, as more fully described hereinafter, when incorporated in relatively small amounts acts as a plasticizer as well as a stabilizer for polyphenylene oxides. This property can be utilized either to lower the molding temperature or to permit a faster molding operation because of the increased plasticity at the same temperature normally used for molding the polyphenylene oxide. Also the amine, acting as a stabilizer, will prevent or substantially eliminate discoloration during the molding operation.

Since the amines which I use are all water- or alcohol-soluble and many of them have relatively high vapor pressures at moderate elevated temperatures, they can be removed after the molding operation if desired, so that the molded object will have the high temperature properties of the unmodified polymer; or if desired, the amines can be left in after molding to provide stabilization to the molded object when it is subsequently subjected to elevated temperatures. Because of these features, my combination plasticizers and stabilizers provide a degree of freedom in molding of the polymers heretofore not obtainable.

The particular polyphenylene oxides which I can use are those disclosed in the above-referenced patents. In addition to these polyphenylene oxides, which can be either homopolymers or copolymers wherein one or more phenols are oxidatively coupled to form the basic polymer, I may use blends of these polymers with other polymers, for example, with a styrene resin as disclosed in the above-referenced Cizek patent, with a polyolefin resin as disclosed in U.S. Pat. 3,361,851—Gowan, with a polycarbonate resin as disclosed and claimed in U.S. Pat. 3,221,080—Fox, etc. Likewise, the polyphenylene oxide may be hot-capped as disclosed in U.S. Pat. 3,375,228—Holoch et al. or decolorized and capped as disclosed in U.S. Pat. 3,402,143—Hay, phenyl-capped as disclosed in U.S. Pat. 3,424,722—Jerussi et al. or reductively hot-capped as disclosed in copending application, Ser. No. 786,475—Factor, filed Dec. 23, 1968 and assigned to the same assignee as the present invention. These polyphenylene oxides are poly-1,4-phenylene oxides and preferably poly(2,6-disubstituted-1,4-phenylene oxides), wherein the substituents are chloro, alkyl or aryl and preferably methyl or phenyl.

The particular amines which I can use as a combination plasticizer and stabilizer have only two basic requirements. They must have at least one amine nitrogen and at least one oxygen present either as a hydroxyl substituent on an alkyl group or as an ether group in a morpholine. In the case of morpholines, the nitrogen and oxygen in the morpholine ring meets both basic requirements. In addition, there can be other amino, hydroxy and morpholino substituents present in any of the amines. The alkyl or alkylene moiety of the amine contributes little, if any, to the attainment of the combination plasticization and stabilization, although it can contribute to the plasticization. Long chain alkyl groups therefore, are generally not desired since the total amount of amine required to be added to the polymer to have the same equivalent amount of amino nitrogen and hydroxy or morpholino oxygen present in the polymer increases as the number of carbon atoms increases.

I generally prefer to use those amines wherein the alkyl or alkylene moieties are lower alkyl or lower alkylene, i.e., not more than eight carbon atoms. When the alkyl group has an aryl substituent, which itself has at least the 6 carbon atoms, such aralkyl groups are preferably those having from 7 to 16 carbon-atoms. Since hydroxyalkyl amines wherein the hydroxy group is on the α-carbon atom are not known, the hydroxyalkyl amines must have at least 2 carbon atoms and the hydroxyl group can be on any aliphatic carbon atom other than the α-carbon atom, i.e., the hydroxy group is not on the same carbon atom as the amino nitrogen group.

Typical examples of the amines I can use are those hydroxyalkyl amines obtained by reacting an alkylene oxide, for example ethylene oxide, propylene oxide, the isomeric butylene oxides (e.g., 1,2- and 2,3-butylene oxides), the isomeric pentylene oxides, the isomeric hexylene oxides, the isomeric heptylene oxides, the isomeric octylene oxides, etc., with ammonia, primary or secondary mono- or polyamines having the formula

where each R is individually selected from the group consisting of hydrogen, alkyl, preferably $C_{1-8}$ alkyl, and aralkyl, preferably $C_{7-16}$ aralkyl, and, in addition, one R can be alkylene, preferably $C_{2-8}$ alkylene, bridging two

groups where R is as defined above, i.e., alkylenediamines, dialkylenetriamines, etc. Depending on the amount of alkylene oxide used, one, up to the total number of the hydrogens on the amine nitrogens of the above amines can be replaced with hydroxyalkyl groups. By further reaction of an alkanolamine having a hydrogen on the nitrogen, a different hydroxyalkyl group than that already present can be introduced, if desired. Those alkanolamines produced by the above reaction which have at least two 2-hydroxyalkyl groups on the same nitrogen can be dehydrated to produce the morpholines and morpholino substituted amines which I can use. For example, 2,2'-iminodiethanol (diethanolamine), can be dehydrated to morpholine, 2,2',2''-nitrilotriethanol (triethanolamine) can be dehydrated to 2-morpholinoethanol, 2,2'-iminodipropanol can be dehydrated to 2,6 - dimethylmorpholine, 2,2'-(2-aminoethyl)-iminodiethanol [N,N - bis(2-hydroxyethyl) ethylenediamine] can be dehydrated to 2-morpholinoethylamine [N-(2-aminoethyl)morpholine], etc. Other hydroxyalkylamines which I can use are those obtained by reaction of ammonia or the above-described amines with an haloalkanol which produces the hydrohalide salt of the amino-substituted alkanol that can be treated with an alkali, for example an alkali metal hydroxide, to produce the amino-substituted alkanol, which alternatively is called a hydroxyalkyl substituted amine.

Because they are more readily available, cheaper in cost and very effective as combination plasticizers and stabilizers, I prefer to use the simple morpholines and hydroxyalkylamines made by reaction of ethylene oxide or propylene oxide with ammonia or primary or secondary $C_{1-8}$ monoamines. Such amines can be represented by the formulae

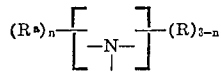

and

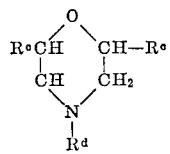

where $n$ is 0, 1 or 2, R is 2-hydroxyethyl, 2-hydroxypropyl or 3-hydroxypropyl, $R^a$ is hydrogen or $C_{1-8}$ alkyl, $R^c$ is hydrogen or methyl and $R^d$ is the same as R and, in addition, $R^a$.

Typical examples of specific amines I can use are:

2-aminoethanol,
2,2'-iminodiethanol,
2,2',2''-nitrilotriethanol,
the 2- and 3-aminopropanols,
the 2,2'-, 2,3'-, and 3,3'-iminodipropanols,
the 2,2', 2''-, 2,2',3''- and 3,3',3''-nitrilotripropanols,
the 2-, 3-, and 4-aminobutanols,
the 2,2'-, 2,3'-, 2,4'- and 4,4'-iminodibutanols,
the isomeric nitrilotributanols, e.g., the 2,2', 2''-, 2,2',3''-, 2,2', 4''-, 2,3',3''-, 2,3',4''-, 2,4',4''-, 3,3',3''-, 3,3',4''-, 3,4',4''- and 4,4',4''-nitrilotributanols,
the isomeric aminopentanols, iminodipentanols, nitrilotripentanols, aminohexanols (including aminocyclohexanols), iminodihexanols, nitrilotrihexanols, aminoheptanols, iminodiheptanols, nitrilotriheptanols, aminooctanols, iminodioctanols, nitrilotrioctanols, etc. N-(2-hydroxyethyl)ethylenediamine, N-(2- and 3-hydroxypropyl)ethylenediamine, N,N- and N,N'-bis(2-hydroxyethyl)propylenediamine, N,N,N' - tris(2 - hydroxypropyl)ethylenediamine, N,N,N',N' - tetrakis(3 - hydroxypropyl)butylenediamine, N - (2 - hydroxyethyl)-N'-(2-hydroxypropyl)ethylenediamine, 2-benzylaminoethanol, 3-phenethylaminopropanol, N-(2-hydroxyethyl)diethylenetriamine, morpholine, 2,6-dimethylmorpholine, 2-ethylmorpholine, 2,6-dibutylmorpholine, N-(2-hydroxypropyl)morpholine, N-methylmorpholine, N-butyl-2,6-dioctylmorpholine, N-benzylmorpholine, N-cyclohexylmorpholine, N - (2 - hydroxypropyl) - 2,6-dimethylmorpholine, 2,2' - (ethylimino) - diethanol, 2,2'-(benzylimino)diethanol, 3,3' - (methylimino) - di-1-propanol, 2 - amino - 2 - ethylpropanediol, diethylaminopropanediols, (2 - hydroxyethylamino)butanols, 1,3 - bis dimethylamino) - 2 - propanol, 1,2 - bis(2,6-dimethylmorpholino)ethane, etc.

The above amines and polyphenylene oxides are intimately blended together to distribute the amine as uniformly as possible with the polyphenylene oxide. This can be done by dissolving the amine in a volatile solvent which preferably should not dissolve the polyphenylene oxide, for example, water or an alcohol, in a sufficient amount that the solution will readily wet the entire surface of the polyphenylene oxide. If the particular amine is a solid, it may, if desired be mixed with polyphenylene oxide by dry-blending of the two powders. If the solution technique has been used, the solvent is allowed to evaporate leaving the amine as a surface coating on the individual particles of the polymer. Only a relatively small amount of the above amines is required to be effective as a combination plasticizer and stabilizer. Amounts in the order of 0.1 to 10% can be used depending on the particular properties desired during molding, and the equivalent weight as discussed above. For any particular amine, the degree of plasticization and stability increases as the amount of amine is increased. However, as the concentration of the amine is increased, particularly if the amine has a relatively high vapor pressure, greater care will be required during molding to prevent bubble formation. In those molding operations where pressure is maintained until the molded part is cooled, bubble formation can be controlled by the temperature to which the part is cooled before the pressure is released. Generally, amounts of amines in the order of 0.5 to 5% by weight of the polymer are very effective and the tendency for bubble formation is easily controlled even with the more volatile amines by the proper adjustment of pressure and temperature during molding.

In order that those skilled in the art may readily understand my invention, the following examples are given by way of illustration and not by way of limitation. In all of the examples, all parts are by weight based on the weight of the polyphenylene oxide unless otherwise stated and temperatures are given in degrees centigrade.

EXAMPLE 1

In this example, various amines in various concentrations were blended with poly(2,6-dimethyl-1,4-phenylene oxide) in powder form. In order to get the maximum effect of stabilization, the powders were not preformed into compressed pellets and an inert atmosphere was not used to protect the polymer during extrusion. Extrusion was carried out in a Tinius Olsen, Model 3, Extrusion Plastometer, which has means for accurately controlling the temperature and the pressure on the plunger. The nozzle orifice was 83 mils in diameter and 315 mils long. The load and temperature were kept constant during the extrusion. A 1 gram sample of the polymer was placed in the bore of the extruder, tamped, the plunger inserted and the pressure applied. Generally, the loading and application of pressure was accomplished in a period of 1 minute and another minute was required for the polymer to come up to temperature of the apparatus. Any extrudate formed during the first 2 minutes was discarded. Thereafter, every two minutes the extrudate was collected until no more polymer extruded.

The flow rate during the total period of time was determined as well as the flow rate during each 2 minute period by dividing the weight of extrudate by the time required to produce it. A significant variation in a flow rate over the entire time of extrusion is easily detected. An increase in flow rate would be indicative of polymer decomposition to low molecular weight products and decrease in flow rate would be indicative of cross-linking. No such effects were noted during any of the extrusions of the controls or the polymer containing the amines, but were evident in those control samples to which acid alone had been added. For each one of the various mixtures reported in Table I, a control containing none of the amine was run at the same time, using the same pressure and temperature as for the polymer containing the amine. When a solvent was used to distribute the amine in the polymer, the control was similarly treated with the pure solvent and dried in the same way.

In general, the extrusions were carried out using the maximum pressure (554 p.s.i.) on the plunger and the temperature used was so chosen that the control of each series would be completely extruded over approximately 10 minutes. In those runs made at higher temperatures, the pressure was decreased to obtain the same effect. The pressure is given in the footnote when the maximum pressure was not used.

The relative flow reported in Table I was obtained by dividing the flow rate of the polymer containing the amine by the flow rate of the control polymer containing no amine and multiplying by 100. The particular amine used, its concentration, the temperature of the extrusion and the relative flow compared to control are shown in Table I. A comparison of the color of the final extrudate with that of the control in all cases show that the extrudate containing the amine was noticeably lighter in color than the control.

TABLE I

| Amine | Percent | Temperature | Relative flow |
|---|---|---|---|
| 2-aminoethanol | 1 | 273 | 161 |
| 2-(ethylamino)ethanol | 3.8 | a315 | 189 |
| 2-(diethylamino)ethanol | 3.3 | a315 | 211 |
| 2,2'-iminodiethanol | 1 | 272 | 153 |
| Do | 1 | 253 | 191 |
| Do | 2 | 253 | 202 |
| Do | 2 | 290 | 310 |
| Do | 2 | 271 | 370 |
| Do | 4 | 252 | 1362 |
| Do | 2.1 | a315 | 293 |
| 2,2',2''-nitrilotriethanol | 1 | 272 | 148 |
| Do | 2.4 | a315 | 390 |
| Morpholine | 1 | 262 | 226 |
| Do | 2 | 262 | 296 |
| Do | 4 | 262 | 520 |
| 2,2',2''-nitrilotripropanol | 1 | 272 | 171 |
| 2,2',2'',2'''-(ethylenedinitrilo) tetraethanol | 1 | 272 | 198 |
| 2-amino-2-(hydroxymethyl)-1,3-propanediol | 2 | a315–16 | 208 | a Pressure 100 p.s.i.

EXAMPLE 2

Although I have found that other amines, amides, etc., will plasticize polyphenylene oxides, they do not offer the added advantage of stabilization during molding. Illustrative of the various other types of nitrogen-containing compounds which I have found which do act as plasticizers, but do not act as stabilizers are illustrated in Table II. The same procedure as used in Example 1 was used in evaluating these compounds. In all cases, these compounds, although increasing the relative flow, produced extrudates that were at least as dark in color as the controls.

TABLE II

| Compound | Percent | Temperature | Relative flow |
|---|---|---|---|
| 2-(2-hydroxyethyl)pyridine | 1 | 273 | 148 |
| Tetraethylammonium hydroxide | 2 | 272 | 123 |
| Tetrakis (2-hydroxyethyl)-ammonium hydroxide | 2 | 272 | 167 |
| Acetamide | 1 | 272 | 111 |
| N-methyl-2-pyrolidone | 1 | 272 | 140 |
| Melamine | 2 | 273 | 147 |
| Imidazole | 2 | 271 | 530 |
| Tribenzyl amine | 1 | 273 | 183 |
| Do | 2 | 273 | 326 |

EXAMPLE 3

Quite often in isolating of the polymer from the reaction mixture from which it is prepared, an organic acid is used and, if not completely removed from the polymer, can cause discolorization from the polymer during molding. This example illustrates that not only are my amines capable of acting as plasticizers and stabilizers, but also have the added advantage of being able to overcome the effect of residual organic acid in the polymer. In performing this example, the specified organic acid was intentionally added to both the polymer stabilized with the amine and the polymer used as the control. The relative flows listed in Table III are again determined by comparing the flow rate of the particular polymer with the flow rate of the polymer containing neither acid nor amine.

TABLE III

| Additive | Percent | Temperature | Relative flow |
|---|---|---|---|
| Benzoic acid | 1 | 273 | 60 |
| Benzoic acid / Diethanolamine | 1 / 2 | 272 | 660 |
| Acetic acid | 2 | 273 | 68 |
| Acetic acid / Diethanolamine | 2 / 2 | 272 | 825 |

Those polymers containing both the amine and acid were much lighter in color than the control containing the acid, thereby demonstrating the effect of the amine to act as both a plasticizer and a stabilizer not only for the polymer, but for overcoming the effect of the acid present.

EXAMPLE 4

Poly(2,6-diphenyl-1,4-phenylene oxide) can not be extruded from the extruder described above. To evaluate the effect of amines on this polymer, it was necessary to use a different technique. Two 0.5 g. samples, one of the polymer and the other of the polymer containing 3% nitrilotriethanol, were placed as a heap between two sheets of aluminum foil and molded into thin discs between the platens of an hydraulic press at 6000 p.s.i. at 225° C. and quenching in water. After removal of the top sheet of foil, it was evident that the sample containing the amine was lighter colored and had flowed more during molding than the control. The top surface area of the disc containing the amine divided by the top surface area of the control multiplied by 100 gave a flow ratio of 172.

When this test was repeated but using poly(2-methyl-6-phenyl-1,4-phenylene oxide) as the polymer and ethyliminodiethanol as the amine, the flow ratio was 132 and the disc made from the polymer containing the amine was lighter in color than the control.

It is obvious from the above examples that the polyphenylene oxides containing my amines are useful in the production of a wide varietly of molded objects. For example, in the making of fibers, films, molded objects and the like. The fact that they have improved color and better heat stability makes the polymers of this invention mose widely applicable, for example, in the making of light colored or uncolored objects, for example, films and fibers, where transparency or lack of off-shades is highly desirable.

Although the above examples have illustrated various modifications of my invention, it is to be understood that other modifications can be made within the full intended scope of my invention. For example, dyes, fillers, pigments, lubricants, other polymers, etc., may be incorporated in the polyphenylene oxide to modify the color or other properties as desired. All such modifications and variations can be made without departing from the scope of my invention as set forth in the appended claims.

What I claim as new and desire to secure by Letters Patent of the United States is:

1. A solid, moldable composition having improved flow and stability during molding, comprising an intimate mixture of a poly(1,4-phenylene oxide) and a small but effective stabilizing amount, based on the amount of polymer, of a least one amine selected from the group consisting of morpholines, any substituents other than hydrogen on the carbon atoms of the morpholine being $C_{1-8}$ alkyl; $C_{2-8}$ hydroxyalkyl amines wherein the hydroxyl group is on a carbon atom other than the α-carbon atom and $C_{2-8}$ alkylene polyamines having at least one $C_{2-8}$ hydroxyalkyl group as previously defined, any other substituents, other than hydrogen, on the amine nitrogen of said amines being selected from the group consisting of $C_{1-8}$ alkyl, $C_{2-8}$ hydroxyalkyl as previously defined and $C_{7-16}$ aralkyl.

2. The composition of claim 1 wherein the poly(1,4-phenylene oxide) is selected from the group consisting of poly(2,6-dimethyl-1,4-phenylene oxide), poly(2-methyl-6-phenyl-1,4-phenylene oxide) and poly(2-6-diphenyl-1,4-phenylene oxide).

3. The composition of claim 1 wherein the amine is an alkanolamine.

4. The composition of claim 1 wherein the amine is an ethanolamine.

5. The composition of claim 1 wherein the amine is a propanol amine.

6. The composition of claim 1 wherein the amine is a morpholine.

7. The process of stabilizing and increasing the flow properties of a poly(1,4-phenylene oxide) which comprises intimately mixing a small but effective stabilizing amount, based on the amount of polymer, of at least one of the amines defined in claim 1 with a poly(1,4-phenylene oxide).

8. The process of claim 7 wherein the poly(1,4-phenylene oxide) is selected from the group consisting of poly-(2,6 - dimethyl - 1,4 - phenylene oxide), poly(2-methyl-6-phenyl-1,4-phenylene oxide) and poly(2,6-diphenyl-1,4-phenylene oxide).

9. The process of claim 7 wherein the amine is an alkanolamine.

10. The process of claim 7 wherein the amine is a morpholine.

References Cited

UNITED STATES PATENTS

| | | | |
|---|---|---|---|
| 3,330,806 | 7/1967 | Borman | 260—30.4X |
| 3,396,146 | 8/1968 | Schmukler | 260—30.4X |

MORRIS LIEBMAN, Primary Examiner

L. T. JACOBS, Assistant Examiner

U.S. Cl. X.R.

260—32.6, 45.9